United States Patent [19]

Pernin

[11] Patent Number: 5,002,290
[45] Date of Patent: Mar. 26, 1991

[54] STATIC SEAL

[75] Inventor: Jean-François Pernin, Chalindrey, France

[73] Assignee: Procal, Langres, France

[21] Appl. No.: 489,076

[22] Filed: Mar. 7, 1990

[30] Foreign Application Priority Data

Mar. 7, 1989 [FR] France .................................. 89 02980

[51] Int. Cl.⁵ .............................................. F16J 15/02
[52] U.S. Cl. ............................ 277/206 A; 277/206 R; 277/209
[58] Field of Search ................ 277/209, 165, 168, 177, 277/215, 206 A, 206 R, 207 A, 207 R

[56] References Cited

U.S. PATENT DOCUMENTS

| 2,247,609 | 7/1941 | Devilbiss | 277/207 |
| 2,610,870 | 9/1952 | Parmesan . | |
| 2,841,429 | 7/1958 | McCuistion | 277/209 |
| 3,052,478 | 9/1962 | Horvereid | 277/209 |
| 3,854,737 | 11/1974 | Gilliam, Sr. . | |
| 4,448,429 | 5/1984 | Thomas | 277/165 |
| 4,582,330 | 4/1986 | Lew et al. . | |

FOREIGN PATENT DOCUMENTS

| 0093772 | 4/1959 | Norway | 277/206 |
| 762232 | 1/1956 | United Kingdom . | |
| 0982219 | 2/1965 | United Kingdom | 277/206 A |

Primary Examiner—Allan N. Shoap
Assistant Examiner—Daniel G. DePumpo
Attorney, Agent, or Firm—Hoffman, Wasson & Gitler

[57] ABSTRACT

A static seal intended to create a fluid tightness between two stationary parts resting against one another along plane surfaces, the seal being housed in a groove made in one of the surfaces. The seal exhibits an approximately quadrangular section each of whose faces comprises an approximately median indentation, preferably of approximately triangular section.

4 Claims, 1 Drawing Sheet

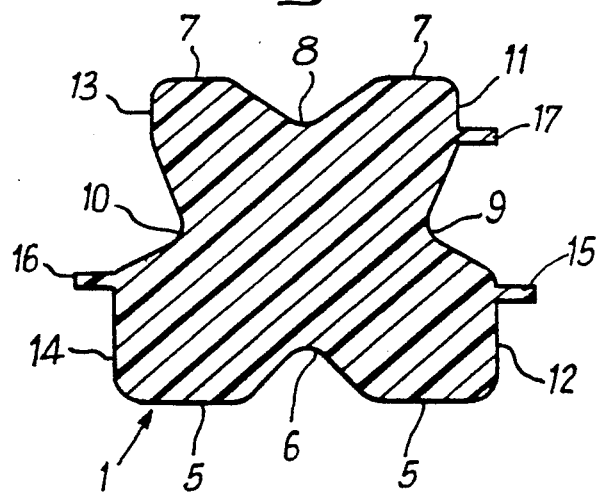
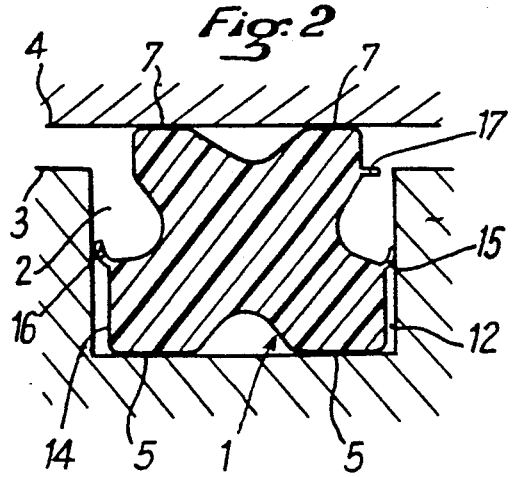
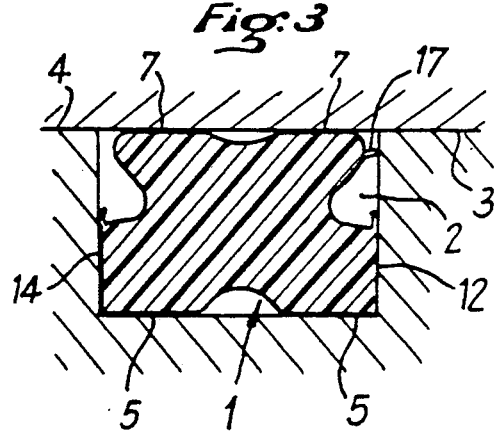

STATIC SEAL

This invention relates to a static seal intended to create a fluid tightness between two stationary parts resting against one another along plane surfaces, the seal being housed in a groove made in one of the surfaces.

By way of particular nonlimiting application, injection pumps can be cited, the seal being placed so as to create the fluid tightness between the body and the head of the injection pump.

Usually for this purpose O-rings are used that exhibit a circular section. To create the fluid tightness, in the groove provided for this purpose in one of the surfaces, such a seal is placed which exhibits a diameter greater than the depth of the groove and which is deformed by crushing when the surfaces of the parts between which the fluid tightness must be created are brought into contact. Because of this deformation, the seal becomes ovalized and a surface fluid tight contact is made between the flattened base of the seal and the bottom of the groove and between the flattened top of the seal and the upper surface applied to the surface that has the groove.

Unless a seal of very great diameter is selected, there is no contact between the seal and sides of the groove, or at most linear contact zones are obtained between the seal and the sides of the groove, these contact zones do not contribute effectively to the fluid tightness.

Further, when a seal of circular section is placed in the groove, it cannot be positioned precisely on the inside of the latter because of the possibility of rolling on the bottom of the groove, so that during the mutual application of the surfaces between which the fluid tightness must be created, the position of the seal cannot easily be controlled.

Static seals have also already been proposed that are intended to create a fluid tightness between two stationary parts resting against one another along plane surfaces, the seal being housed in a groove made in one of the surfaces and exhibiting an approximately quadrangular section each of whose faces comprises an approximately median indentation, preferably of approximately triangular section, said seal comprising a lower plane face intended to be applied to the bottom of a groove made in the surface of one part, an upper plane face on which the surface of the opposite part rests and two lateral plane faces at least parts of which, in the compressed state of the seal, come in surface contact with the sides of groove.

Thus, this seal comprises a lower plane face intended to be applied to the bottom of a groove made in the surface of one part, an upper plane face on which the surface of the opposite part rests and two lateral plane faces at least part of which, in the compressed state of the seal, come in surface contact with the sides of the groove.

The invention is proposed to achieve a static seal which, by the shape of its section, makes it possible in particular to avoid the drawbacks of current seals.

The invention has as its object a seal with an approximately quadrangular section of the above type, essentially characterized by the fact that small tongues projecting outward are provided in the lateral faces of the seal, in the parts of the lateral faces that are between the recess and the inside face of the seal.

When the seal is placed in the groove intended to house it, and before the compression of the seal caused by the mutual application of the surfaces between which the fluid tightness must be created, these small tongues rest against the sides of the groove and contribute to the positioning and to the holding of the seal in the groove preventing any displacement of the seal in it during handling of the parts before their assembly.

A similar small tongue can also be made projecting from at least one of the parts of the lateral faces of the seal between the recess and the upper face of the latter. When the seal is compressed in the groove, this or these additional small tongues constitute lips that rest against the sides of the groove and that provide an additional fluid tightness In a preferred embodiment of the invention, the upper plane face exhibits a smaller width than the lower plane, the lateral faces of the seal each consisting of two plane parts, offset laterally, parallel to one another and located on both sides of the recesses made in said lateral faces.

The seal according to the invention can be made with the same materials as standard O-rings, particularly of rubber or of elastomer.

To have the invention better understood, an embodiment will now be described by way of example that is in no way limiting with reference to the accompanying drawing in which:

FIG. 1 is a view in section of a seal according to the invention;

FIG. 2 illustrates the seal placed in a groove before deformation; and

FIG. 3 is a view similar to FIG. 2 after compression of the seal in use position.

The illustrated seal designated overall by 1 is intended to be housed, as can be seen in FIGS. 2 and 3, in a groove 2 made in a surface 3 of a part with which a surface 4 of another part must come in contact, seal 1 being intended to create a fluid tightness between the two parts when surfaces 3 and 4 are brought in mutual contact.

The seal exhibits an approximately quadrangular section with a general X-shaped appearance.

The seal comprises a lower plane face 5 provided with a median recess with an approximately triangular section 6 and an upper face 7 also provided with a median recess with an approximately triangular section 8.

In the example shown, the width of upper face 7 is less than that of lower face 5 to facilitate the deformation of the seal during the compression exerted by the resting of surface 4 to the extent that this compression resting occurs on a smaller surface.

A good deformation of the seal by compression is permitted by recesses 6 and 8 and by recesses 9 and 10, also of approximately triangular section, made in the lateral faces of the seal.

In the example shown, each of the lateral faces consists of two parts 11, 12 and respectively 13, 14, upper parts 11 and 13 being offset laterally inward in relation to lower parts 12 and 14, respectively.

As can be seen better in FIG. 1, at the upper end of parts 12 and 14, small tongues 15 and 16 projecting outward are provided and, in the same way, a small tongue 17 is provided at the base of lateral wall part 11.

As can be seen better in FIG. 2, when the seal is placed in groove 2, small tongues 15 and 16 come in contact with the lateral sides of the groove and constitute elements for positioning and holding the seal in the groove.

After deformation, and as can be seen in FIG. 3, a surface fluid tight contact is achieved at the bottom of the groove by lower face 5 of the seal, at the sides of the groove by wall parts 12 and 14, and at surface 4 by upper face 7 of the seal. Thus, an improved fluid tightness is obtained in comparison with standard O-rings of circular section.

As can be seen in FIG. 3, small tongue 17 constitutes an additional fluid tight lip.

Although the invention has been described in connection with a particular embodiment, it is quite obvious that it is in no way limited and that various variants and modification scan be made to it without thereby going outside its scope or its spirit.

I claim:

1. A static seal intended to create a fluid tightness between two stationary parts resting against one another along plane surfaces, the seal being housed in a groove made in one of the surfaces the groove having a bottom wall and opposing side walls spaced by a width and extending from the bottom wall, said seal having an approximately quadrangular section each of whose faces comprises an approximately median indentation, preferably of approximately triangular section, said seal comprising a lower plane face intended to be applied to the bottom of the groove, an upper plane face on which the surface of the opposite part rests and two lateral plane faces at least parts of which, in the compressed state of the seal, come in surface contact with the sides of the groove, said seal including small tongues (15, 16) projecting outwardly from said lateral plane faces (11, 12; 13, 14), on the parts (12, 14) of the lateral plane faces that are between said indentations (9, 10) located closest to the groove sides and said lower plane face (5) of the seal.

2. The seal according to claim 1, wherein the seal comprises a small tongue (17) projecting from at least one of the parts (11, 13) of the lateral plane faces of the seal between said indentations (9, 10) located closest to the groove sides and the upper plane face (7) of the seal.

3. The seal according to claim 2, wherein said upper plane face (7) exhibits a smaller width than said lower plane face (5), each lateral plane face comprising two plane parts (11, 12; 13, 14) offset laterally from each other, parallel to one another, and located on opposite sides of said indentations (9, 10) located closest to the groove sides.

4. The seal according to claim 1, wherein the upper plane face has a smaller width than that of the lower plane face, each lateral plane face comprising two plane parts offset laterally from each other, parallel to one another, and located on opposite sides of said indentations located closest to the groove sides.

* * * * *